Jan. 3, 1961 J. C. NYBERG 2,966,980
COINBOX FOR SUBSCRIPTION TELEVISION
Filed Dec. 30, 1957 12 Sheets-Sheet 1

INVENTOR.
JOHN C. NYBERG
BY
ATTORNEYS

Fig. 2.

Jan. 3, 1961    J. C. NYBERG    2,966,980
COINBOX FOR SUBSCRIPTION TELEVISION
Filed Dec. 30, 1957    12 Sheets-Sheet 6

INVENTOR.
JOHN C. NYBERG
BY
ATTORNEYS

Jan. 3, 1961 J. C. NYBERG 2,966,980
COINBOX FOR SUBSCRIPTION TELEVISION
Filed Dec. 30, 1957 12 Sheets-Sheet 7

FIG. 9.

INVENTOR.
JOHN C. NYBERG
BY
ATTORNEYS

Jan. 3, 1961    J. C. NYBERG    2,966,980
COINBOX FOR SUBSCRIPTION TELEVISION
Filed Dec. 30, 1957    12 Sheets-Sheet 9

INVENTOR.
JOHN C. NYBERG
BY *Lyon & Lyon*
ATTORNEYS

Jan. 3, 1961 J. C. NYBERG 2,966,980
COINBOX FOR SUBSCRIPTION TELEVISION
Filed Dec. 30, 1957 12 Sheets-Sheet 10

INVENTOR.
JOHN C. NYBERG
BY
*Lyon & Lyon*
ATTORNEYS

INVENTOR.
JOHN C. NYBERG
ATTORNEYS

United States Patent Office 2,966,980
Patented Jan. 3, 1961

2,966,980

COINBOX FOR SUBSCRIPTION TELEVISION

John C. Nyberg, North Hollywood, Calif., assignor, by mesne assignments, to Paramount Pictures Corporation, New York, N.Y., a corporation of New York Filed Dec. 30, 1957, Ser. No. 706,119

5 Claims. (Cl. 194—1)

This invention relates to subscription television systems and, more particularly, to a coinbox for use in a subscription television system.

In a Patent No. 2,769,024, for Television Control System, to Del Riccio et al., there is described a subscription television arrangement wherein a television transmitter transmits coded, or unintelligible, television program material to a plurality of receivers. Those receivers which belong to subscribers to the television system are equipped with apparatus which receives not only the coded television program, but other associated information comprising pulses representative of the price of this program and other pulses identifying the program. The pricing pulses are applied to a coinbox, which then indicates the amount of coinage which is required to be paid before the decoding portion of the receiver can be actuated. Upon the deposit of said coinage in the coinbox, the receiver is enabled to decode and present an intelligible program, and a recorder located at the receiver is enabled to record the pulses which identify the fact that the program has been purchased. This enables proper credit to be given to whichever sponsor has paid for the program.

The present invention is directed to an improved coinbox for utilization in a subscription television system. This coinbox not only can display a price which must be deposited before a program can be viewed, but, in the event the subscriber does not have the correct amount of change and deposits more than the amount required, the coinbox will display the amount of such overpayment, which is referred to as "credit."

Accordingly, an object of the present invention is the provision of a novel and improved coinbox suitable for use in a subscription television system.

Still another object of the present invention is the provision of an improved coinbox with improved credit features.

Yet another object of the present invention is the provision of a more simple and inexpensive coinbox suitable for use in subscription television.

These and other objects of the present invention are achieved by providing a coinbox and tape-recording structure wherein there is provided coin-sizing mechanism, a credit wheel, and a price wheel in addition to the tape recorder. Solenoid mechanism is provided for turning the price wheel to the position where it indicates a price demanded for viewing a program. Each coin used for paying the price demanded is deposited into a slot in the coinbox. Upon the insertion of a coin into the coinbox, a motor is energized to drive certain cams within the coin-sizing mechanism which results in a rotation of the credit wheel through an arc, the length of which is determined by the value of the coin. When this has been completed, a pair of idler gears are lowered to be in contact with both the credit and pricing wheel. The credit wheel is then allowed to return to its initial position, and in so doing it rotates the pricing wheel through the idler gears in a direction to reduce the price demanded by the amount of the coinage deposited.

The above-described operation is repeated each time a coin is deposited until the deposited coinage equals the value of the price demanded for viewing the program. At this time, the price wheel reaches a position known as a first paid-up position. This position closes a switch, which enables the tape-recording mechanism to operate and record the program-identification information. A timing motor attached to the tape recorder, after a suitable interval, emits a pulse which advances the price wheel to a second paid-up position, at which the tape recorder is rendered inoperative. The price wheel is maintained at the second paid-up position until the termination of the program. This is signaled by the termination of the carrier wave carrying the price and program-identification information. The price wheel is then allowed to return to its initial position.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
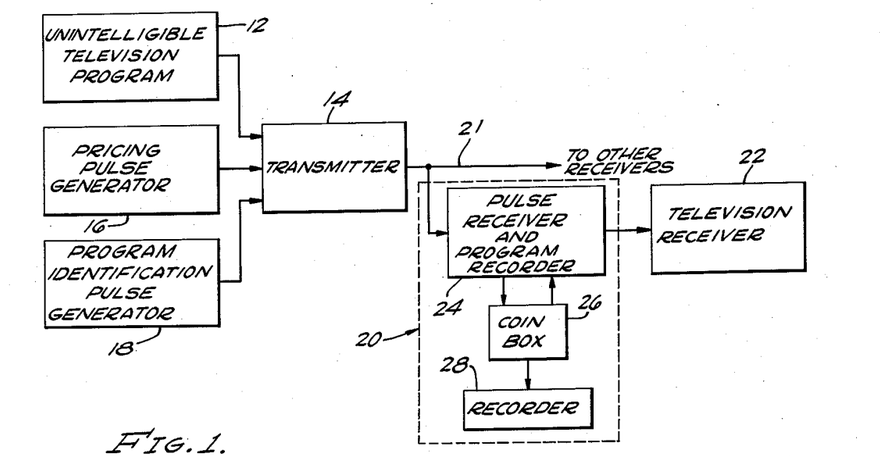
Figure 1 is a block diagram of a subscription television arrangement shown to illustrate the environment in which this invention finds its greatest use.

Figure 1 is a simplified block diagram illustrating a subscription television system within which this invention may be employed. This arrangement will include at the transmitter an unintelligible television program source 12. This represents the usual video signal apparatus, such as a television camera, as well as the necessary audio apparatus for converting the sound accompanying a performance into program sound, both of which are converted to a form whereby nonsubscribers to the subscription television system, or subscribers who have not yet paid the amount required for viewing the program, cannot intelligibly reproduce these signals.

Also applied to the transmitter 14 are pulses representative of the price demanded for viewing the television program. These are obtained from a pricing-pulse generator 16. Pulses for signals for identifying the program are also obtained from a program-identification pulse generator 18 and are applied to the transmitter 14. The output of the transmitter is applied to either an antenna for radiation over the air or to a cable for distribution over a closed-wire system.

Each subscriber receiver within the subscription television system will be equipped with a receiver attachment 20. Such receiver attachment will either be connected between an antenna and the television receiver 22 of the subscriber, or, in the case illustrated for closed-circuit television, between the distribution cable 21 and the television receiver 22.

Such receiver attachment will include electronic circuitry, including a circuit 24 for receiving the pricing and program-identification pulse signals and separating them from the television program signals, and decoding the coded television program. The decoding arrangement, however, does not function until such time as the price required for viewing the program has been paid. The attachment 20 will include a coinbox 26, to which the pricing pulses are applied to establish the price required to be paid. Upon payment of such price, the coinbox will actuate a recorder 28, which can now record the program-identification pulses which have been generated at the transmitter. The coinbox will actuate the decoder in the pulse-receiver and program-decoder apparatus 24, whereby the television receiver 22 can now proceed to present an intelligible picture and sound.

Figure 1A:
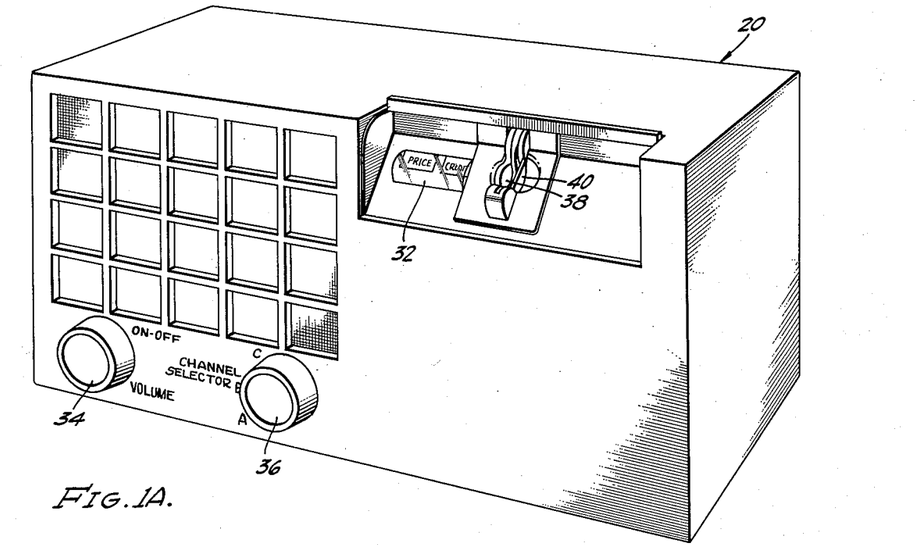
Figure 1A is an isometric view of the housing which covers this invention and associated electronic equipment.

An isometric view of the receiver attachment may be seen in Figure 1A. The housing for the receiver attachment 20 covers both the electronic equipment for receiving pulses and applying them to the proper apparatus, as well as for receiving the television program signals and decoding them, and also the coinbox which includes structure whereby both the price of the program to be seen is indicated in a window 32, as well as any overpayment of the price demanded, which is shown as credit in this window. At this point, attention is directed to the fact that the electronic circuitry which is included in the attachment for the receiver is described and claimed in an application by Patrick R. J. Court et al., entitled Receiver Attachment, filed January 20, 1958, Serial No. 709,979, and assigned to a common assignee.

The volume control 34 is also the on/off switch control. This controls the amplitude of an audio signal, which is heard when program audio is not heard, and which audio signal is designated as "barker audio." It accompanies the other signals and informs the subscriber as to the merits of the program, the time as to when it can be seen, the price, and other pertinent information. The other control knob 36, seen in Figure 1A, controls the channel selection. By this control knob, any one of the many subscription television channels may be selected. This apparatus is not a part of this invention. A complete description of the operation of this portion of the system is found in the above-noted patent application of Patrick R. J. Court et al.

Upon the receipt of the pricing signals, the price demanded for a program is shown in the window 32. If a subscriber wishes to purchase that program, he deposits coins in the coin slot 38. In order to deposit these coins, he must simultaneously actuate a switch lever 40. The coin slot 38, which is the entrance to the coinbox, is closed each time a coin is deposited until that coin has been processed. By "processing" the coin is meant that the price shown in the window 32 is reduced by the amount of such coin. The coin slot is then opened to receive further coins.

Figure 2:
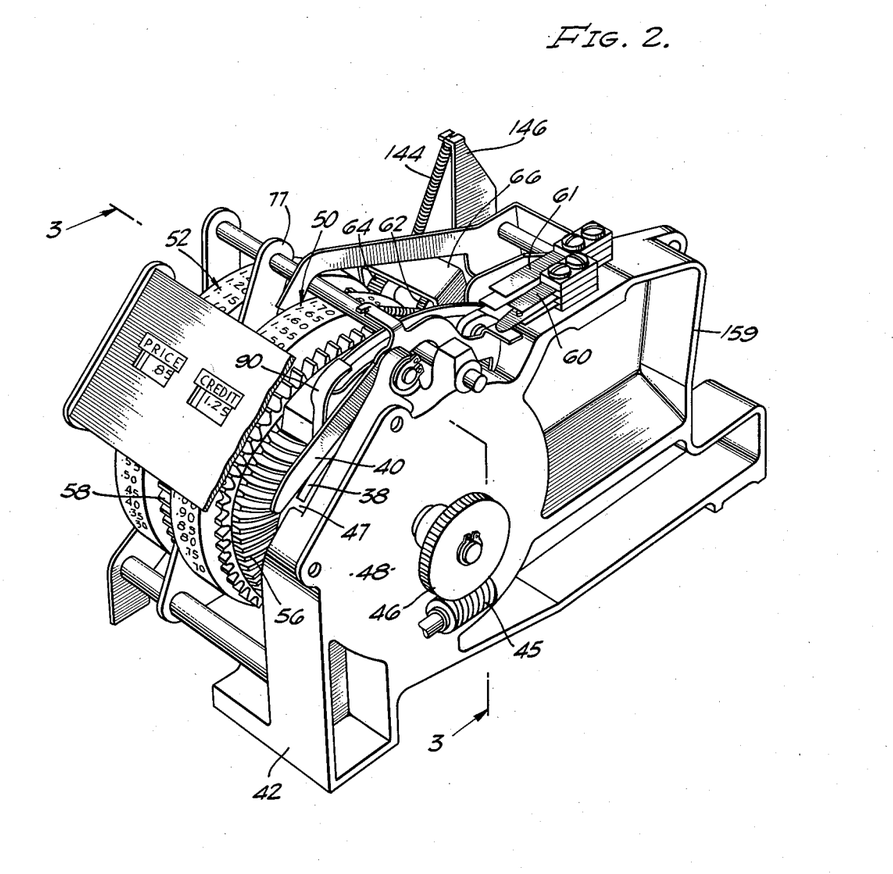
Figure 2 is an isometric view of the embodiment of this invention, which is the coinbox mechanism shown with the housing removed.

Reference is now made to Figure 2, which is an isometric view of an embodiment of this invention with the cover housing removed and with the tape-recording attachment removed in the interests of clarity. The apparatus is mounted upon a base 42. A worm gear 45 is driven from a motor, not shown in this view. The worm gear drives a gear 46, which in turn drives coin-sizing mechanism which is enclosed in a housing 47 including a cover plate 48. The coin slot 38 is made in the wall of the housing 47 for the coin-sizing apparatus. A credit wheel 50 and a price wheel 52 are mounted to be rotatable on the same axis as the gear 46. As one side of the credit wheel are gear teeth 54 and one face of the credit wheel has serrations 56. On one side of the price wheel 52 are also gear teeth 58. The credit wheel 50 and the price wheel 52 are both marked with the money indicia. As shown, the divisions of this indicia differ in terms of five cents. The switch arm 40 which is in the coin-slot entrance, when depressed, closes a switch 60, which, as will be described subsequently, energizes the motor to cycle the coinbox. As long as a coin is only part way into the coin-slot, switch 61 has its contacts maintained open. This switch has its contacts in series with those of switch 60. As a result, no operations can commence until a coin has passed through the coin slot. This protects the mechanism against continuous operation by a faulty or deliberate jamming of the coin slot.

The following is a description of the coinbox operation. Before a pricing operation of the coinbox, the price wheel is positioned so that no price appears in the window. This is the blank position. Adjacent to the blank position are the indicia for the maximum price value to be charged. When pricing pulses are transmitted, the effect in the coinbox is to cause the price wheel to be rotated in a direction first to the maximum price value indicia and then to reduce the price indicated from the maximum to the value desired for a program. Each pulse from the transmitter reduces the price indicated by five cents. The price wheel is held in position by a solenoid-operated pawl arrangement. When the price wheel is moved from its blank position, it works against the tension of a spring, which seeks to restore the price wheel to the blank position, but is restrained therefrom. When a coin is deposited into the coinbox for the purpose of paying the price demanded, the coin is first sized and then the credit wheel is rotated through an arc, the length of which depends on the value of the coin. The credit wheel is held in position and indicates the amount of the coin which was deposited. In being rotated to the position at which the credit wheel shows the value of the coin deposited, the credit wheel also is moved against the tension of a spring, which seeks to restore it to the zero credit position. At this time, a pair of idler gears 62, 64, which are carried by a bracket 66, is lowered to engage the gear teeth on the side of the price and credit wheels. The credit wheel is then permitted to rotate back to its initial position, driven by its spring. In doing this, the credit wheel rotates the price wheel against its spring tension to reduce the price by the amount of the money which has been deposited. Thereafter, the idler gears are removed from engagement with the credit and price wheels, and the system is ready to receive the next coin.

Figure 3:
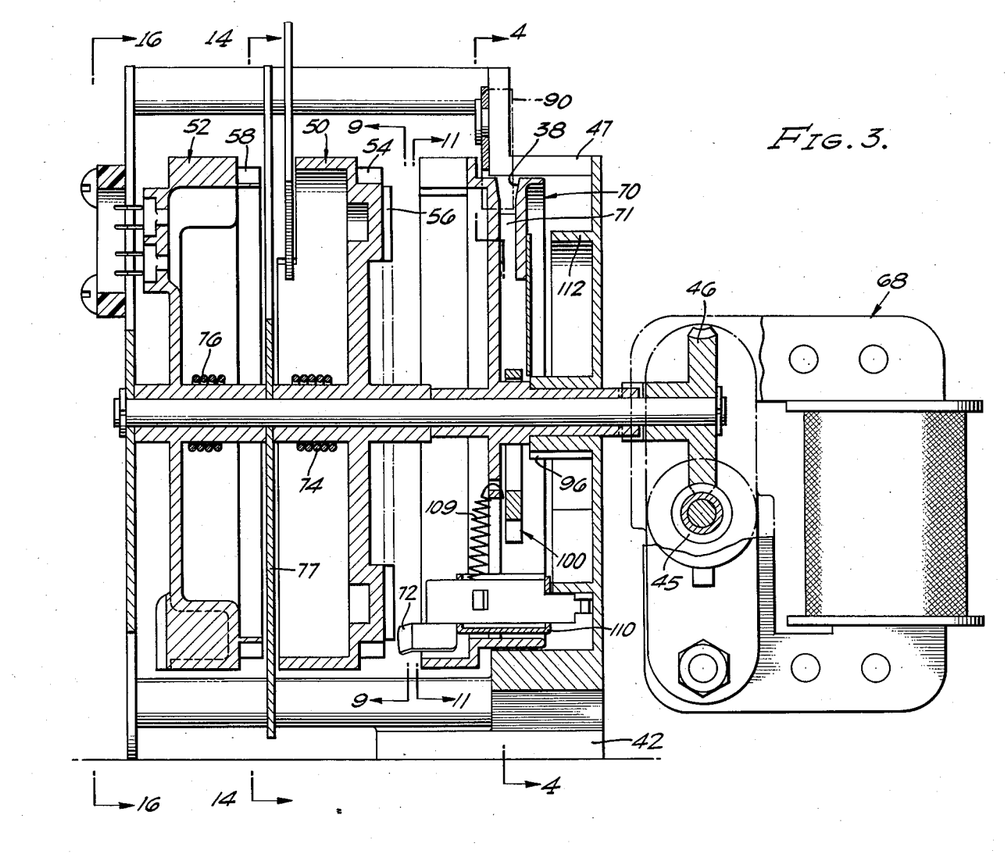
Figure 3 is a sectional view taken on the line 3—3 of Figure 2 and shows details of the driving mechanism of the coinbox.

Reference is now made to Figure 3, which is a section taken along the lines 3—3 of Figure 2. This is a cross section of the coinbox mechanism. A motor 68 through the gears 45 and 46 can rotate a drive plate 70, when operated. The gear 46, the drive plate 70, the credit wheel 50, the price wheel 52 are all rotatably supported on a shaft 69, although these are not driven when the shaft is rotated. Each time a coin is dropped into the coinbox, the motor rotates the drive plate 70 through a complete revolution. As soon as it commences to rotate, a portion 71 of the drive plate covers the coin slot until the drive plate has turned through 360°. Part of this revolution is used up in sizing the coin which is dropped, and another part of this revolution is in moving the credit wheel through an arc representative of the value of the coin. It was previously pointed out that the side of the credit wheel had serrations 56. A pawl 72 at a proper time during the cycle (as may better be seen in Figure 10) moves into engagement with the one of the serrations positioned opposite thereto, whereby the credit wheel 50 can be rotated against the tension of the spring 74 through an arc whose length is representative of the value of the coins. Thereafter, the idler gears 62, 64 (shown in Figure 15) are lowered to be in contact with the gear teeth on the price and credit wheels to enable the credit wheel to drive the price wheel through a similar arc against its spring 76 to reduce the value of the price which has been established. The spring 76 tends to prevent the drive of the price wheel by the credit wheel, but since the spring 74 is a heavier one, this force is overcome without difficulty. The price wheel 52 carries therewith contacts 80, 82, which, as will be subsequently explained in connection with Figure 16, at the blank, the first, and the second paid positions of the price wheel, position the contacts to make connections between lead pairs, such as 84, 86.

Figure 5:
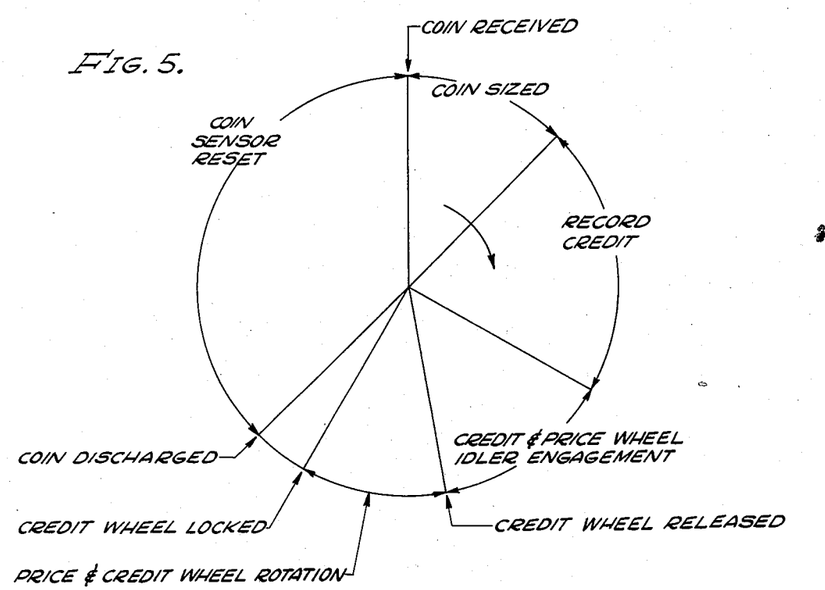
Figure 5 is a cyclic diagram shown to assist in an understanding of the invention and explains the sequence of events which occur when the coin-sizing mechanism is cycled.

Reference is now made to Figure 5, which shows the operation of the coin mechanism during a cycle which is initiated upon the deposit of a coin. The drive plate 70 will be rotated through a cycle, causing a number of different operations to follow one another. As soon as a coin is inserted through the coin slot, a coin-sizing operation occurs over a first portion of the cycle wherein the value of the coin is determined from its size. At this time, a cam having an appropriate length is selected for moving the pawl 72 into engagement with the serrations 56. The length of the cam during which such engagement occurs is determined by the size of the coin which has been dropped. The next portion of the cycle is that in which the idler gears are lowered into engagement with the gear teeth on both the credit and price wheels. Thereafter, the credit wheel is released to drive the price wheel through the idler gears. The credit wheel is then locked in position during the next portion of the cycle, so that in the event the value of the coin exceeded the amount of the remaining price which has been demanded, the credit wheel will be in the position which stores and indicates the fact that an excess of coinage has been deposited. During the remaining portion of the cycle of operation, the coin which has been deposited is discharged into the collection portion of the coinbox, and the mechanism is reset for receiving the next coin.

Figure 4:
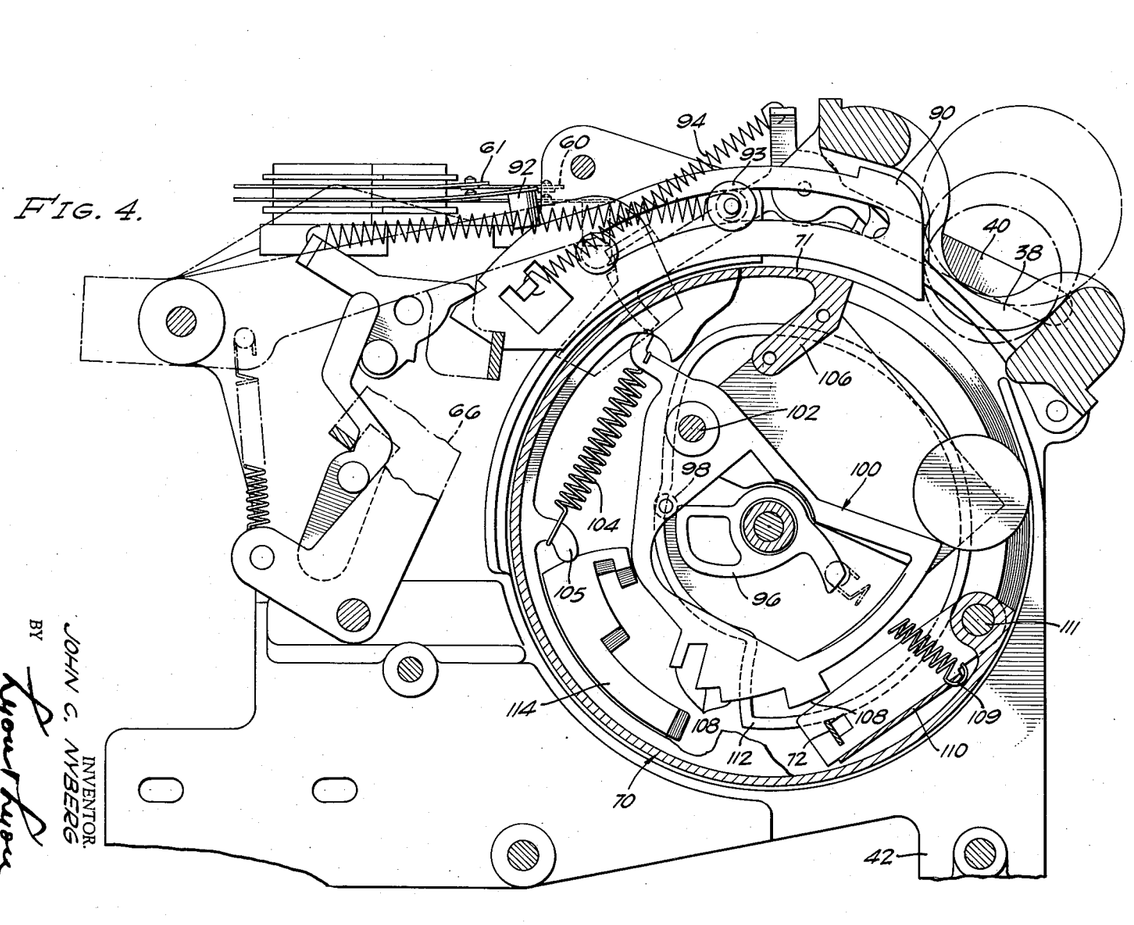
Figure 4 is a vertical section taken along the lines 4—4 of Figure 3 and shows the details of the coin-sizing mechanism.

Figure 4 is a section along the lines 4—4 of Figure 3 and shows the details of the coin-sizing mechanism. The mechanism will operate with coins having the values five cents, ten cents, twenty-five cents, and fifty cents, as shown in Figure 4. These coins are deposited through the coin slot 38 in the wall of the housing 47 and enter the coin mechanism shown in Figure 4 at the upper right-hand side. When the coin is deposited, as was previously described, the switch arm 40 is moved, which serves to close the contacts of the drive-motor-operate switch 60. However, during the process of putting a coin into the coin slot, a member 90, which may be designated as a guard member, and which may also be seen in Figure 2, is pushed backwards, or away from the opening of the coin slot. The contacts of switch 61 are spring-biased to be normally open. However, guard member 90 is urged by a spring 94 into the coin slot. In this position, a contact button 92 mounted on the lower contact spring of switch 61 is urged upward to close the switch contacts. When the guard member is moved by the insertion of a coin into the coin slot, it is guided by the pin 93, which extends into a slot therein. It removes support for the contact button 92, to thereby enable the contacts of switch 61 to open. Accordingly, as long as a coin is held partly into the coin slot opening, the contacts of switch 61 will remain open. These contacts are connected in series with the contacts of switch 60 and the drive motor, and, therefore, even though the contacts 60 are closed, the motor will not operate. Once a coin has either been completely inserted into the coin mechanism or has been completely withdrawn from the coin mechanism, a spring 94 pulls the guard member 90 back in position, to enable the switch contacts 61 to be closed, whereby the motor can operate if the contacts of switch 60 are still closed, or will not operate when the coin is withdrawn from the coin slot.

After a coin has been inserted into the coin slot and the motor 68 is energized, the drive plate member 70 is driven by the motor. In rotating, it has a portion which extends over the coin slot opening to block it and prevent the putting in of another coin until the cycle of operation is completed, at which time the drive plate member has a narrow portion which permits the complete opening of the coin slot.

Figure 6:
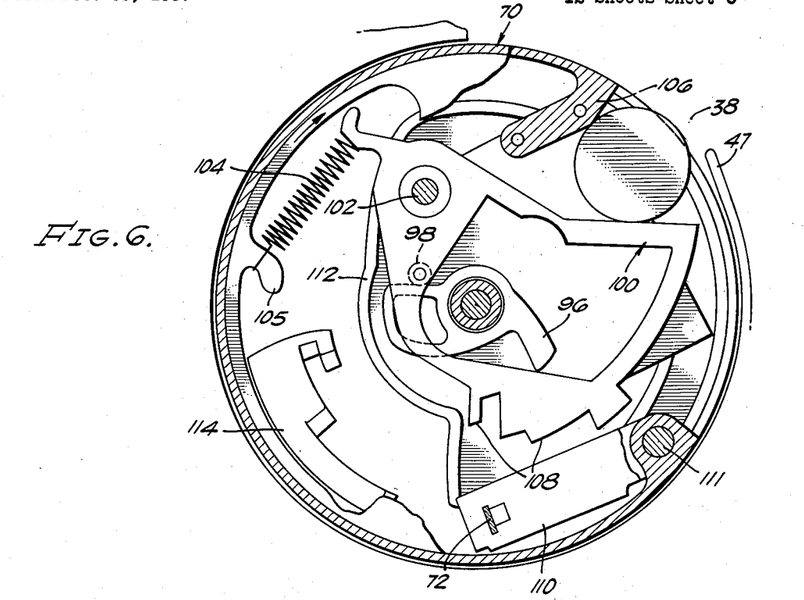
Figures 6, 7, and 8 are views of the coin-sizing mechanism showing progressive movement thereof during the operation of sizing a coin.
Figure 7:
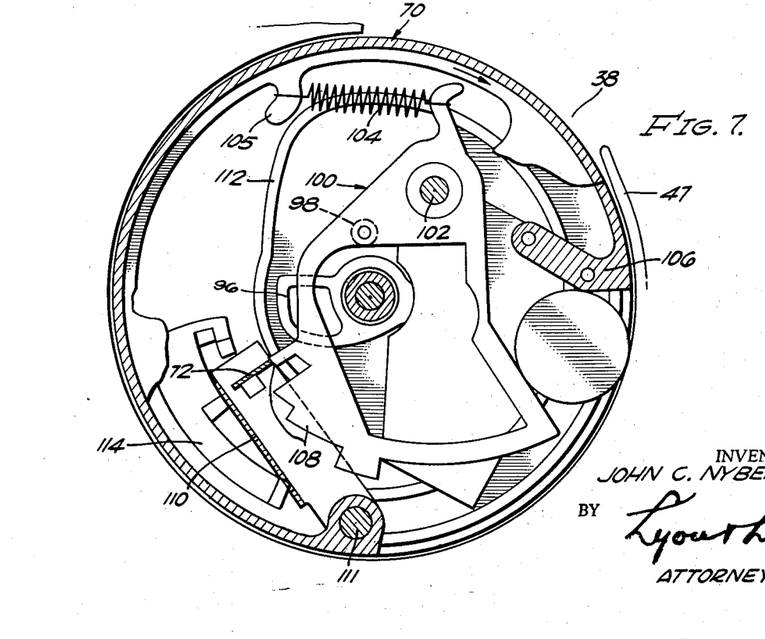
Figure 8:
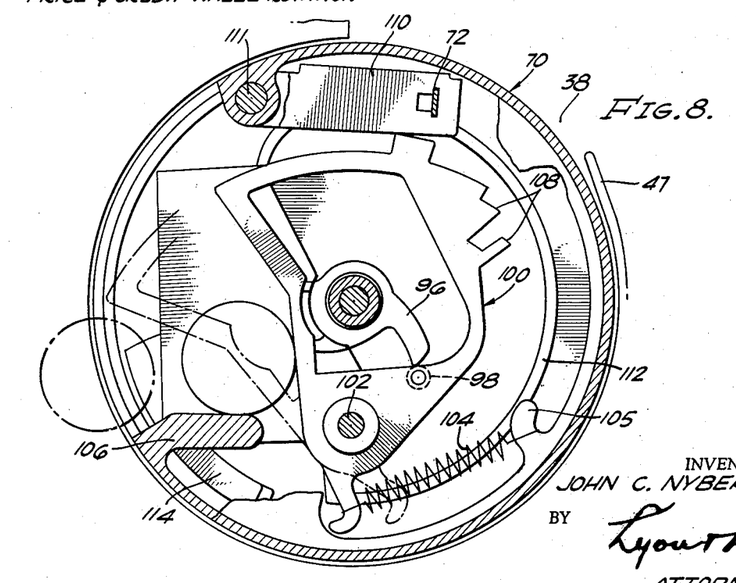

Figure 4 shows the position of the coin-sizing mechanism when a coin is first dropped into the coin slot. Figures 6 and 7 show two steps in the coin-sizing operation, with Figure 7 being the position at which the credit wheel is about to be engaged. Figure 8 shows the position at which a coin is ejected from the coin-sizing mechanism into the coin collector. Two cams must be considered at this time. One of these is known as the sensing cam 96, which is stationary and over which there is moved a cam follower 98, which controls the motion of a senser member 100. Upon the dropping of a coin, the motor 68 commences to rotate, and, in doing this, it rotates the drive plate 70. The senser member 100, which carries the cam follower 98, is pivotally mounted on a pin 102, which is attached to the drive plate and has one end attached to a spring 104. The other end of the spring is secured to an anchoring projector 105 on the drive plate. Thus, effectively, the spring 104 initially serves to cause the cam follower 98 to follow the contour of the sensing cam 96. In doing this, the senser 100 pushes against the coin which is dropped into the coin-sizing mechanism until it moves it against the outer wall. Obviously, the senser can only move against the coin to the extent determined by the size of the coin. Thus, the senser assumes a position during the first part of the cycle which is determined by the size of the coin which has been dropped into the coin-sizing mechanism. As shown in Figure 6, as the drive plate 70 continues to rotate, the coin will be held between the outer wall of the housing 47, the senser member 100, and a projection 106 mounted on the drive plate. The spring 104 maintains the coin in place as the drive plate continues to be rotated.

As a result of the operation described, the end of the senser 100 to which the spring 104 is not attached is pivoted to a position determined by the size of the coin which has been dropped into the coin-sizing apparatus. This end of the senser carries "coin stops" 108, each of which is designated by the value of the coin to which it corresponds. Positioning of the senser simultaneously positions one of the coin stops 108 so that as the drive plate continues to rotate with this mechanism, a pawl carrier 110, which carries the pawl 72 will engage the coin stop corresponding to the value of the coin dropped to thereafter maintain a radial distance from the center of the coin-sizing mechanism determined by the coil stop. It will be noted that the coin stops present different levels corresponding to different coin sizes and/or values. The pawl carrier 110 is pivotally mounted on a pivot pin 111, which is supported by the drive plate. The spring 109 has one end attached to the drive plate and the other end to the pawl carrier to pivot it toward the center of the mechanism. A stationary cam 112, called a finger cam, against which one end of the pawl 72 is held, prevents inward pivoting of the pawl carrier 110 until the coin stops have been moved in position.

In order to maintain orientation with respect to the motions which are occurring, it should be noted that first the senser cam 96 is maintained stationary. The senser member 100 is rotated by the motion of the drive plate 70, by which it is carried in a clockwise direction. The spring 104 tends to pivot the senser member in a counterclockwise direction (as shown in Figure 4) around the pivot 102, but is restrained by the cam follower 98 following the cam 96 and eventually by the presence of a coin. The pawl carrier 110 tends to be pivoted toward the center of the coin-sensing mechanism by a spring 109. The pawl carrier 110 is also supported from and carried with the drive plate 70.

When a coin is dropped into the coin-sensing mechanism, the motor 68 is energized and starts to rotate the drive plate. As the drive plate is rotated, the cam follower 98 follows the sensing cam 96 and establishes the position of the senser member 100, so that when the pawl carrier 110, which follows a stationary finger cam 112 until the proper time, falls off of that finger cam in response to the pull of the spring 109, it will be held from further inward pivoting by the one of the coin stops 108 which is determined by the size of the coin within the sizing mechanism. As the drive plate continues to rotate, the one of the sizing cams 114 which is in the path of the pawl 72 carried by the pawl carrier 110 will engage that pawl and move it outwards into engagement with the serrations 56 on the side of the credit wheel 50. Figure 7 shows the position of the pawl carrier 110, when it is engaged by the ten-cent cam stop 108, and as the pawl 72 is about to ride upon the ten-cent sizing cam 114.

Figure 9:
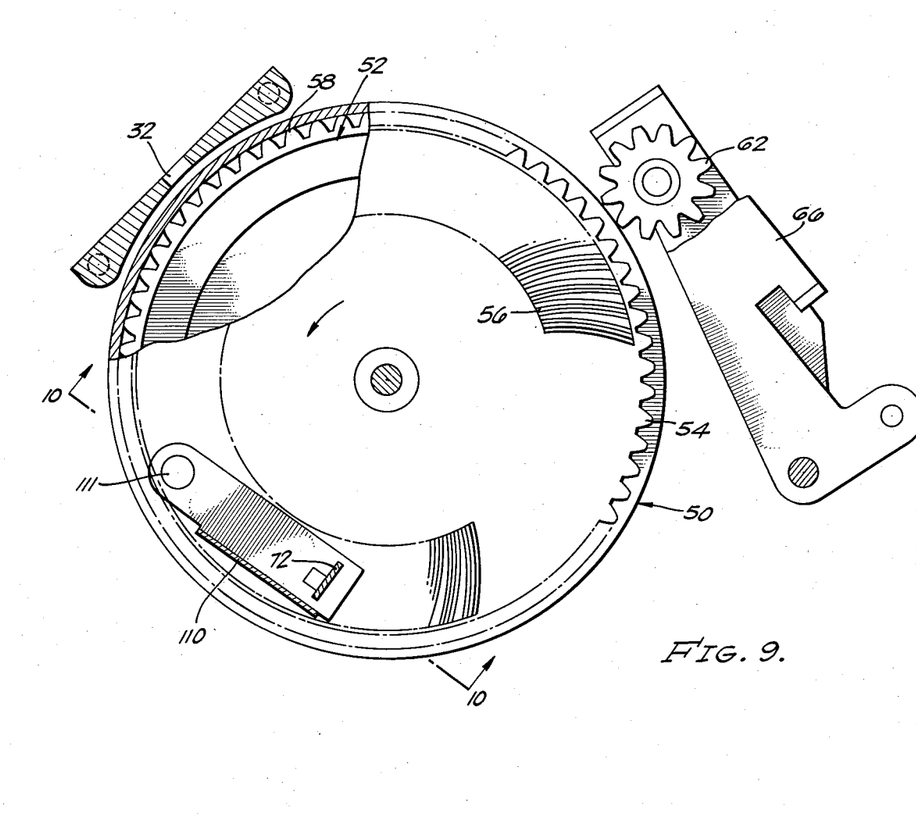
Figure 9 is a view along the lines 9—9 in Figure 3 and shows the credit-wheel face.
Figures 10, 11:
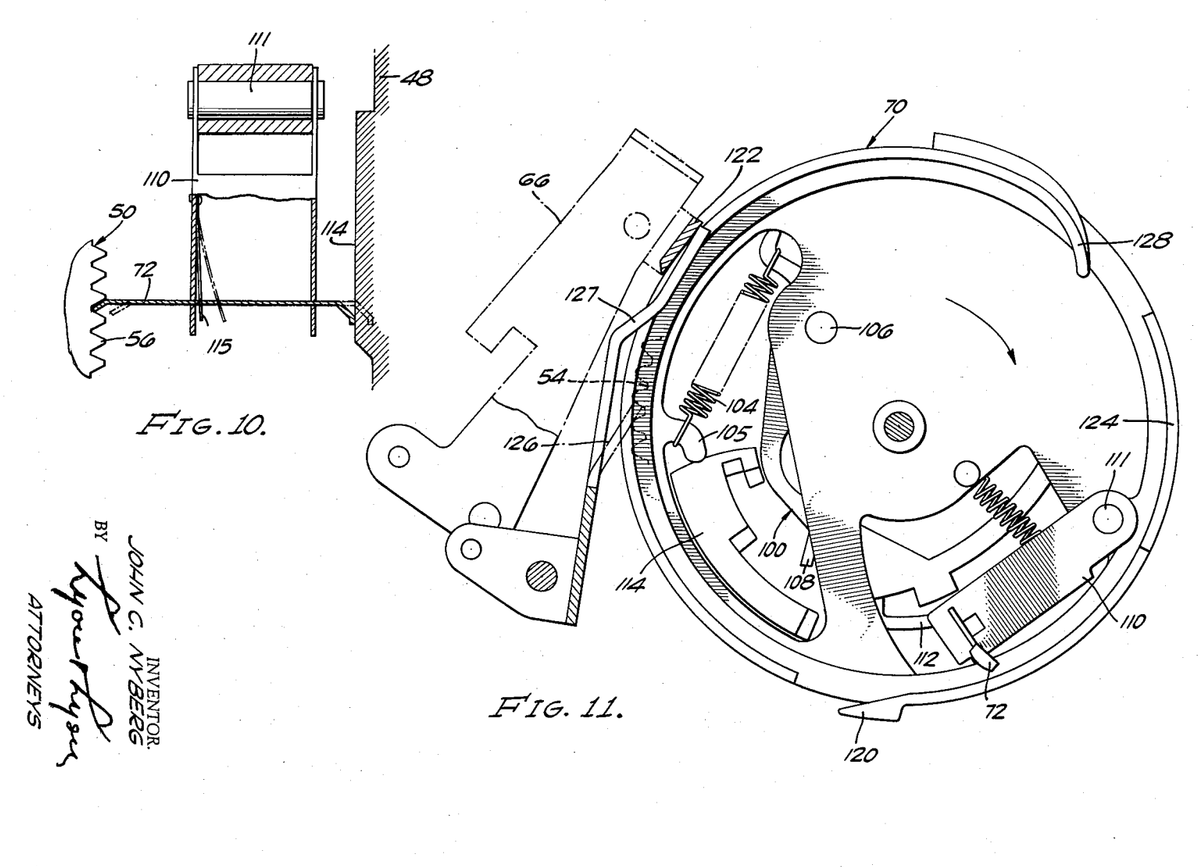
Figure 10 is a detail taken along the lines 10—10 in Figure 9 and shows the credit-wheel actuating pawl.
Figure 11 is a view of the driving plate taken along the lines 11—11 of Figure 3 and shows the drive plate co-operation with the credit wheel, credit-wheel stop, and the finger cam surfaces.

Referring now to Figure 10, which is taken along the lines 10—10 of Figure 9, there is shown a view of the end of the pawl carrier 110 and pawl 72. Figure 10 shows how the pawl 72 rides up on the sizing cam 114, which has been selected by the preceding operations. When pawl 72 rides up on the sizing cam, it is moved against the restoring force of a spring 115 to engage one of the serrations 56 on the credit wheel. The length of time which the pawl 72 will be so maintained in engagement with the credit wheel serration is determined by the one of the sizing cams which it has engaged which, in turn, is determined by the one of the coin stops 108 which has engaged the pawl 72, which, in turn, is determined by the size of the coin against which the senser member is urged.

When the pawl 72 reaches the end of the sizing cam 114, it drops off the sizing cam and the spring 115 can restore the pawl, thereby removing it from engagement with the serrations 56. The drive plate 70 continues to move, carrying with it the coin which is pressed against the wall of the coin-sizing housing. In the course of the motion, the cam follower 98 will be brought into contact with the tail of the sensing cam 96 until it reaches the lower right-hand tip of the sensing cam 96 (see Figure 8). At this position, the cam follower 98 falls off the end of the sensing cam 96, whereupon the spring 104 can snap the senser back and, in so doing, can kick the coin through an opening in the housing out of the sizing mechanism into a coin-collection box 160 (see Figure 17). The projection 106 serves to guide the coin out of the coin-sizing mechanism. Thereafter, the motor continues to rotate the driving plate for the purpose of restoring the coin-sizing mechanism to the coin-receiving position shown in Figure 4.

Referring back to Figure 5, it will be noted that the description which has just occurred is the one which covers the "coin-sizing" and "record-credit" portion of the cycle. Next to be described is how the idler gears are brought into and out of engagement with the credit and price wheels for the purpose of applying this credit to the price established on the price wheel.

Figure 9 is a view along the lines 9—9 in Figure 3. It shows the side face of the credit wheel 50 and the relative positions of the idler gears 62, 64 and the window 32, through which the price and credit may be observed. Also shown are the serrations on the side of the credit wheel engaged by the pawl 72 on the carrier member 110. The direction of rotation of the credit wheel shown by the arrow is the direction moved by the action of the pawl to register the coin deposited.

Reference is now made to Figure 11, which shows the drive plate 70 at its home or starting position, as well as the cams and the idler gear carrier, which is actuated in response to those cams to bring the idler gears into and out of engagement with the price and credit wheels. Prior to reaching the coin-ejecting position shown in Figure 8, but just after the credit wheel has been established in the position indicative of the value of the coin which has been deposited, the drive plate 70 carries an idler bracket cam 120 into a position at which it engages the surface of a gear bracket cam 122, which is attached to the part of the idler gear bracket 66 facing the credit and price wheels. The idler bracket cam rides over and pulls down on the gear bracket cam 122 with the result that the gear bracket is brought down far enough so that the idler gears engage both the credit and price wheels. While the above operation occurs, another cam carried on the drive plate 70, which is called the credit-wheel-stop disengage cam 124, is carried to a position at which it will move a pivotably mounted pawl designated as a credit-wheel stop 126 out of engagement with the gear teeth of the credit wheel, whereby the credit wheel is free to return toward the "no-credit" position driven by the spring tension, which has just previously set up when the value of the coin deposited was established in the credit wheel.

Figure 12:
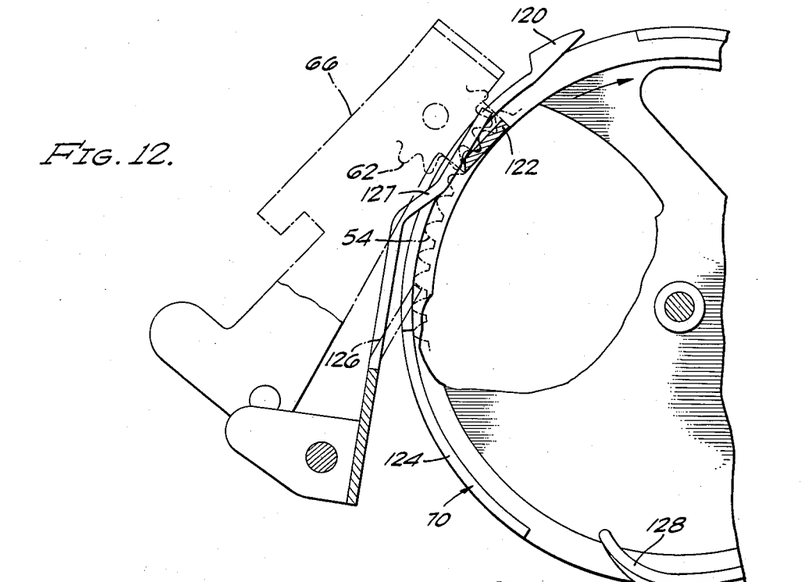
Figures 12 and 13 are partial views showing progressive action between the drive plate, idler-gear bracket, and the credit-wheel stop.
Figure 13:
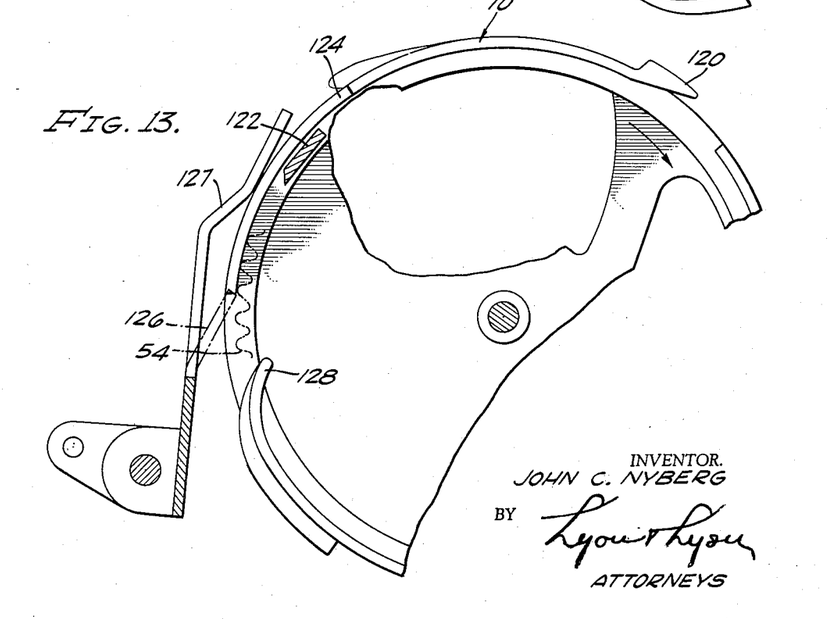

Figure 12 shows the position of the credit-wheel-stop disengage cam 124 just before it engages the credit-wheel stop 126. Figure 13 shows the credit-wheel-stop disengage cam after it engages the credit-wheel stop 126 to move it out of engagement with the credit-wheel gear teeth 54. The extension member 127 merely serves to insure that the credit-wheel stop will engage the gear teeth on the credit wheel. The idler gears remain in engagement with the credit wheel and the price wheel for the interval required for the idler bracket cam 120 to be moved out of position and for idler disengage bracket 128 to be moved into position. The idler disengage bracket is shaped to lift the idler gear bracket cam 122 outward away from the price and credit wheels, so that the idler gears are no longer engaged with the price and credit wheels, but are moved to a position suitable for a subsequent engagement when required. Simultaneously therewith, the credit-wheel-stop disengage cam 124 has moved out of engagement with the credit-wheel stop 126, so that it can drop back into engagement with the gear teeth of the credit wheel and prevent it from losing any credit which has still been stored therein.

The above description completes the description of the remaining portions of the cycle diagram shown in Figure 5. The idler gears are brought into engagement with the price and credit wheels; the credit wheel is released. A time is permitted for drive of the price wheel from the credit wheel. The credit wheel is again locked by the stop 126, and the coin-sizing mechanism thereafter returns to its home position.

Figures 14, 15:
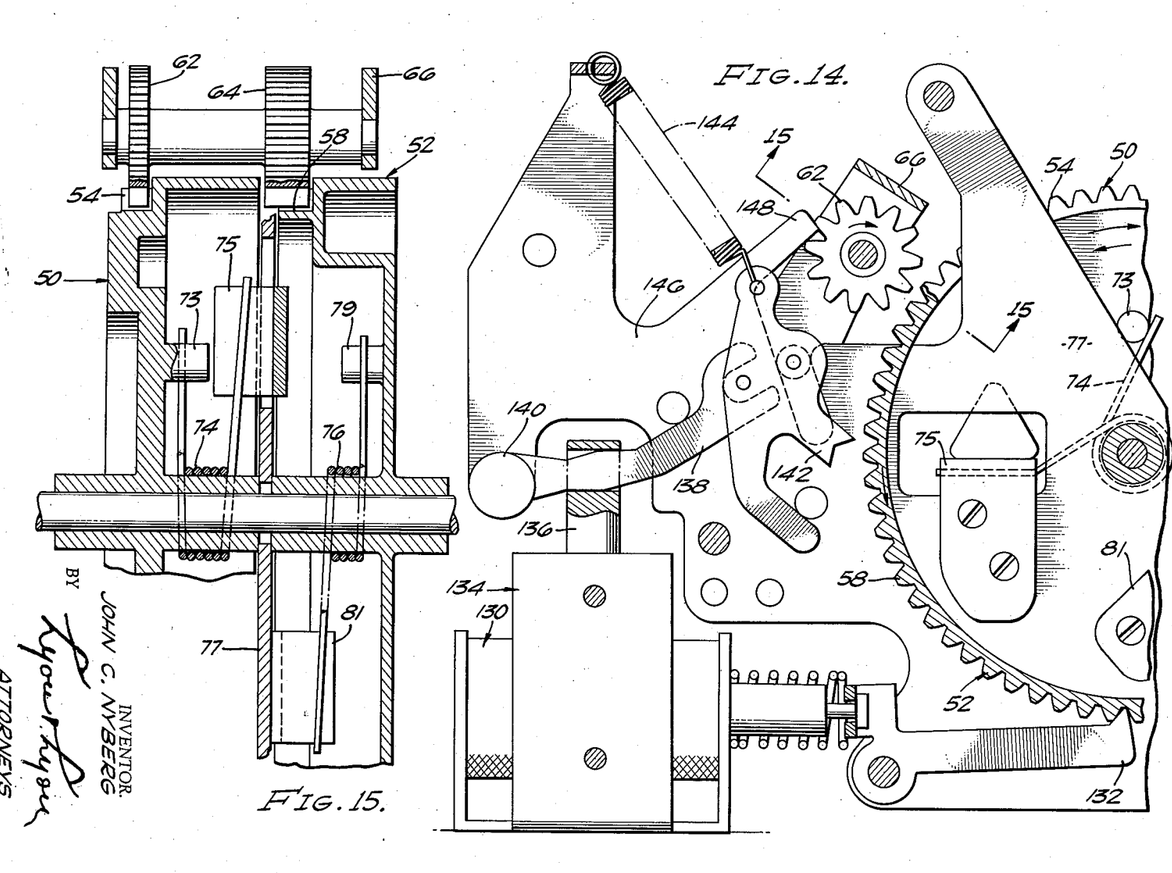
Figure 14 is a section taken along the lines 14—14 on Figure 3 and shows the advancing mechanism for the price wheel.
Figure 15 is a section along the lines 15—15 in Figure 14 and illustrates the relationship between the pricing and credit wheel and the idler gears employed for coupling them.

Referring to Figure 15, there is shown a section along the lines 15—15 of Figure 14 through the price and credit wheels. The section also illustrates how the springs 74, 76 are mounted. Spring 74 is mounted over the axial portion of the credit wheel. One end of the spring is attached to a stop 73 mounted on the credit wheel. The other end of the spring 74 is attached to a stop 75, mounted on a stationary plate 77 supported between the price and credit wheels. The spring 76 is also mounted over the axial portion of the price wheel. One end of the spring is attached to a stop 79 attached to the price wheel; the other end of the spring is attached to a stop 81 mounted on the stationary plate 77.

Reference is now made to Figure 14, which shows the mechanism whereby the price wheel is established at the proper position for indicating an amount demanded for a program. In accordance with the teachings of the above-noted patent to Del Riccio et al., as well as the application by Patrick R. J. Court et al., for setting up a price, there is transmitted repetitively a pulse train, designated as a control pulse train, which includes pricing pulses and recording pulses. The control pulse train enables the energization of a solenoid 130, whereby the retaining pawl 132 is put in position to hold the pricing wheel from moving in response to any tension in its spring 76 which will occur in the course of setting up a price. It will be understood, of course, that at the outset there is no spring tension, since the pricing wheel is on its blank position. Subsequently, in response to pricing pulses, a pricing solenoid 134 is energized once for each pulse. Each time solenoid 134 is energized, it moves its armature 136 downward. This pulls downward a first arm member 138 attached to the armature. The arm member 138 is pivotably attached to a pivot pin 140. The pivot pin is supported by the stationary side bracket 146. In moving downward, arm member 138 urges a price-setting pawl 142 downward to engage the gear teeth of the price wheel and rotate the price wheel one stop, equivalent to five cents. As the solenoid 134 is de-energized, the spring 144 having one end anchored in the side bracket 146 and the other attached to the pricing pawl 142, pulls the pricing pawl 142 out of engagement with the price wheel. The price wheel cannot return to its blank position, in view of the operation of the holding pawl 132 restraining motion in this direction. The side bracket 146 serves a further function. A projection thereof 148 comes into engagement with the teeth of the idler gear 64 over the price wheel and positions it and the other idler gear 62 to which it is mechanically coupled so that when the idler gear is next brought into contact with both the price and credit wheel gear teeth, the idler gears will properly engage therewith. The double claw shape of the price-setting pawl 142 enables a positive engagement with the price-wheel gear teeth for the purpose of moving the price wheel the distance established in response to a single price pulse and to prevent extra movement or overthrow of the price wheel by reason of a fast operation of the member 142 in engaging the price wheel sufficiently to ordinarily cause an overthrow.

Figure 16:
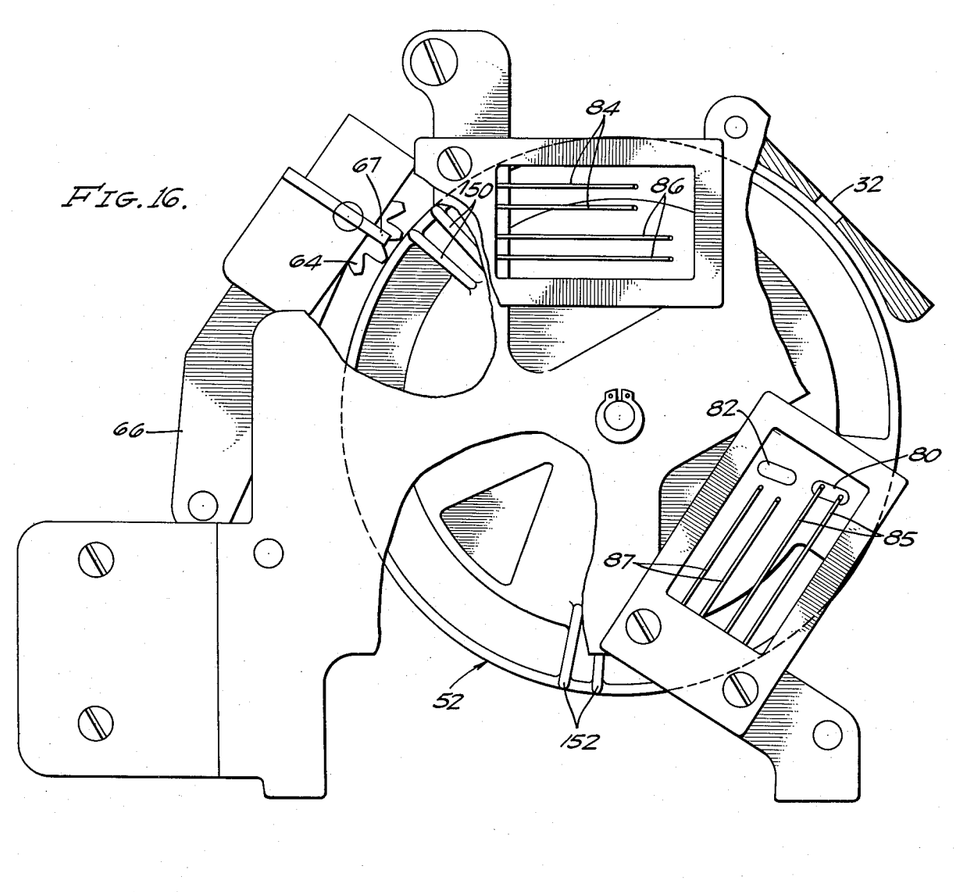
Figure 16 is an end elevation along the lines 16—16 of Figure 3 and shows details of the switches operated by the pricing wheel.

Reference is now made to Figure 16, which is a plan view along the lines 16—16 of Figure 3. It shows the side of the price wheel which carries therewith the movable contacts 80, 82, which respectively bridge the switch leads 84, 86, which are fixedly positioned alongside of the price wheel. A further set of switch leads 85, 87 are respectively bridged when the price wheel arrives at its first and second paid-up positions. The price wheel carries two sets of stops 150, 152. The purpose of these stops is to prevent any rotation of the idler gears 64, 62 at respectively the position at which there is no price set up in the pricing wheel and at the position at which the pricing wheel is at its full paid-up position. These stops enable the deposit of coins when the price wheel is at either of the mentioned positions followed by rotation of the credit wheel to indicate the amount deposited, followed by engagement of the price and credit wheels by the idler gears. However, since the idler gears are prevented from rotating by either of the stops 150, 152, the amount inserted in the credit wheel is not dissipated. The bracket 66, which carries the idler gears, has also mounted on it a co-operating stop member 67. The position of the price wheel, which is shown in Figure 16, is the one in which there is no price entered thereinto. The stop members 150 are positioned so that should the idler gears carried by the idler bracket 66 be moved to engage the credit and price wheel, the stop member 67 engages the stops 150 and thus prevents the price wheel from being rotated. Since the credit wheel is locked in position before the idler gears are removed from engagement with both the price and credit wheel, the credit wheel has not lost any of the amount which was racked up when the coin was deposited.

Assume now that the price wheel is rotated to a position indicative of a price to be demanded for a program. Thereafter, the price wheel, by reason of the deposit of coins, is rotated further until it comes to a first stop position. At this first stop position, a second set of stop members 152 are at the location where the first set of stop members 150 are shown in Figure 16. Therefore, any overpayment of the price demanded on the price wheel will be racked up as credit stored in the credit wheel and the operation of the stops 152 and the stop member 67 is the same as has just been described. Accordingly, this coinbox operates to not only reduce the price on the price wheel, but also to store credit in the event that the amount deposited has been larger than the amount demanded, or an amount is deposited when no amount is demanded.

The switch-contact leads 85, when bridged, indicate to electrical circuitry that the price wheel is in its blank position. In accordance with circuitry described in the application to Patrick R. J. Court et al., since a train of control pulses always starts with a pulse having a longer duration than the following pulses in the train, this affords a means for insuring the start of a response to a train of control pulses only at the beginning thereof. The switch contact leads 85, when bridged, connect electrical circuit components into the pulse-responsive circuit, which only enables response to a starting pulse because of the values of these components. As soon as response to a starting pulse has occurred, the price wheel is moved, and thereafter the associated pulse-responsive circuit can respond to the shorter pricing pulses. When switch contact leads 86 are bridged, the first paid position has been reached, and television decoding and recording of program-identification information is made to occur. Switch contact leads 84 are bridged at the second paid position, signaling this position to associated circuitry.

Figures 17, 18, 19, 20:
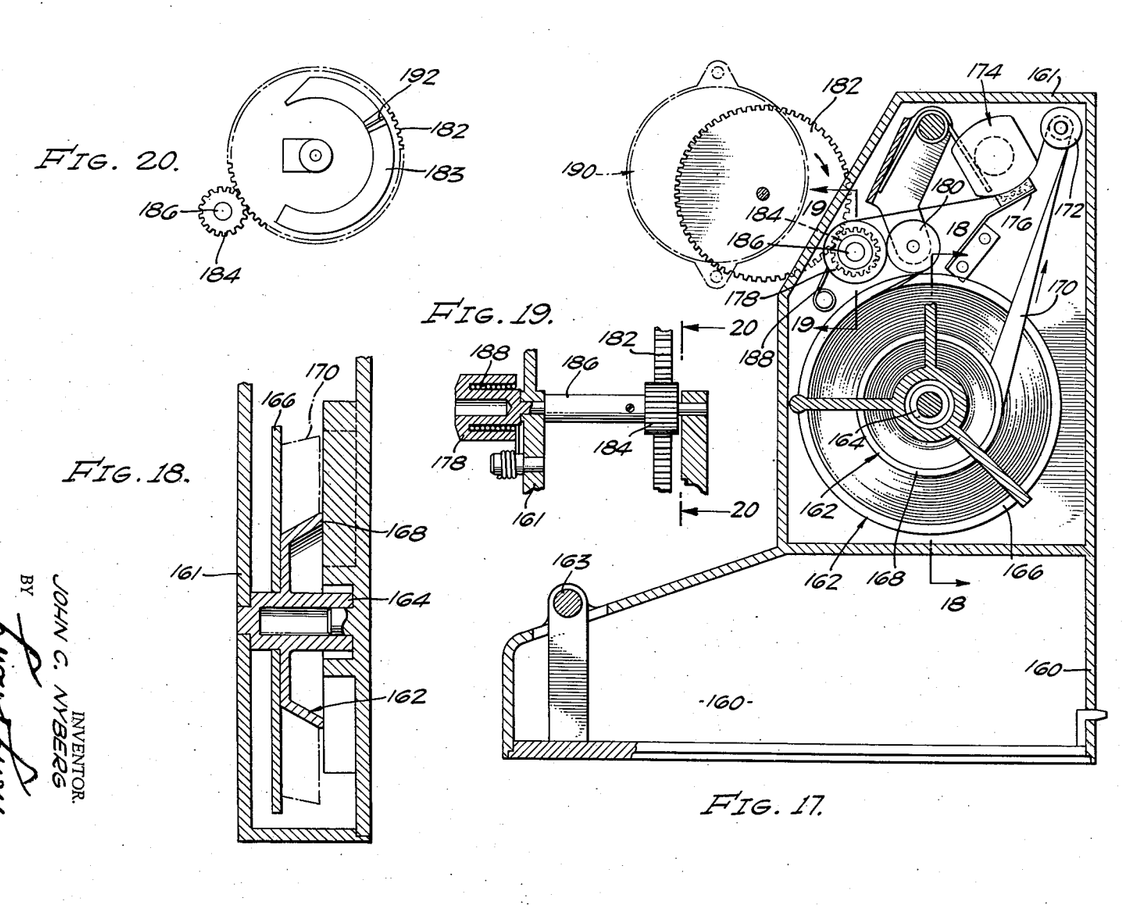
Figure 17 shows the tape recorder and coin-receiver box mechanism.
Figure 18 is a sectional view along the lines 18—18 on Figure 17 and shows the tape reel structure.
Figure 19 is a section along the lines 19—19 in Figure 17 and shows the structure of the tape-drive capstan.
Figure 20 is a rear view of the driving gear for the tape recorder mechanism.

Figures 17 through 20 are directed to the tape recorder portion of the coinbox, which is mounted behind and adjacent to the coin-sizing portion of the coinbox. It should be noted that the housing 161 for the tape recorder will mate with the end bell 159 behind the coin-sizing mechanism housing 47 (see Figure 2). It can be attached by the bracket 163. The bottom portion 160 of the housing 161 is that portion into which coins are discharged from the coin-sizing mechanism. The top portion contains the tape-recording mechanism. Referring now to the tape recorder itself, shown in Figure 17, this will include a tape reel 162, details of the structure of which are shown in Figure 18. This tape reel includes an inner hub 164, which is rotatably mounted in the housing 160 and outer hub 168. The hub 164 carries a flange 166. The outer hub 168 has the flanges thereof flaring outward at an angle away from the center for the purpose of permitting the tape 170 to be pulled from off a tape roll around this hub 168 from the center and rewound on the outside of the tape roll.

Referring back to Figure 17, the tape path will include a first idler post 172, a tape-recording head 174, a pressure pad 176 applying the tape to the head 174, a drive capstan 178, a pressure roller 180, from which the tape is then led back onto the outer portion of the tape roll.

Figure 19 is a view along the lines 19—19 of a section through the drive capstan. The gear 182 drives a mating gear 184 on a shaft 186. The shaft, in turn, drives the capstan proper 178. The capstan has mounted therein a negator spring 188, which serves the function of preventing any backward motion of the capstan. The gear 182 is driven from a timing motor 190.

Figure 20 shows another view of the gear 182, which engages the gear 184, driving the capstan shaft. The motor 190 is a timer motor, which after rotating the gear a certain amount in order to insure that the information transmitted over the air has been recorded, emits a pulse indicative of the fact that this amount of tape has been pulled, whereby the solenoid 134 receives a pulse to move the price wheel from the first to the second paid position. The timing motor 190 operates a microswitch (not shown) having a switch contact 192. The switch contact 192 is stationary, and as the gear 182 rotates driven by the motor, a cam 183 maintains the switch contact 192 in position so that the microswitch is open. When the cam terminates at the end of the desired driving interval for the tape, the contact 192 is no longer held up by the cam and can enable the microswitch (not shown) to close, thereby operating a circuit to emit the desired pulse to the solenoid 134.

Accordingly, there has been shown and described herein a novel, simple, and useful arrangement for use in a subscription television system of the type wherein it is desired to establish from a transmitter the price for viewing a program, securing payment for such program before allowing it to be seen, making a recording of data identifying the program if payment is made, and establishing credit for any overpayment or payment when no program for which a payment is demanded is being transmitted. Such credit is applied to reduce the price of the next pay program to be transmitted.

I claim:

1. A coinbox for use at a receiver in a subscription television system of the type wherein signals from the transmitter are employed to establish a price required to be deposited in the coinbox before the receiver is enabled to intelligibly present a program, said coinbox comprising a first and a second wheel, means for rotatably supporting said first and second wheels, means for establishing a first position for said first wheel representative of no-price demand, means for establishing a second position for said first wheel representative of full payment of a price, first spring means for biasing said first wheel against rotation from said first position, means for establishing a no-credit position for said second wheel, second spring means for biasing said second wheel against rotation from said no-credit position, said second spring means providing a stronger bias than said first spring means, means for rotating said first wheel through an arc against the bias of said first spring means responsive to said signals from said transmitter to establish said first wheel at a position between said first and second positions representative of a price required to be paid, means for preventing said first wheel from being returned to said first position by the bias of said first spring means, coin-sizing means including means responsive to the insertion of a coin for rotating said second wheel from said no-credit position against the bias of said second spring means through an arc representative of the value of said coin, means for holding said second wheel against the bias of said second spring means, means for releasing said means for holding said second wheel to enable said second spring means to return said second wheel toward said no-credit position, means for coupling said second wheel for driving said first wheel in the direction of said second position when said second wheel is being returned toward said no-credit position in a direction to establish said first wheel at a position representative of a reduction from said price required to be paid by the amount of said drive, means for applying said holding means to said second wheel, means for removing said means for coupling, and means actuated responsive to said first wheel reaching said second position to indicate the full payment of said price.

2. A coinbox for use at a receiver in a subscription television system of the type wherein signals from the transmitter are employed to establish a price required to be deposited in the coinbox before the receiver is enabled to intelligibly present a program, said coinbox comprising a first wheel and a second wheel, means for rotatably mounting said first and second wheels adjacent each other, means for establishing a first position for said first wheel representative of no-price demand, means for establishing a second position for said first wheel representative of full payment of a price, first spring means for biasing said first wheel against rotation from said first position, means for establishing a no-credit position for said second wheel, second spring means for biasing said second wheel against rotation from said no-credit position, said second spring means providing a stronger bias than said first spring means, means for rotating said first wheel against the bias of said first spring means through an arc responsive to said signals from said transmitter to establish said first wheel at a position between said first and second positions representative of a price required to be paid, means for preventing said first wheel from being returned to said first position by the bias of said first spring means, coin-sizing means including a rotatably supported driveplate, means responsive to the deposit of a coin in said coin-sizing means to rotate said driveplate through a revolution, means actuated by said driveplate only during a first part of its revolution to rotate said second wheel against the bias of said second spring means through an arc whose length represents the value of a deposited coin, means for holding said second wheel in position against the bias of said second spring means, means actuated responsive to said driveplate during a second part of its revolution to couple said second wheel to said first wheel for driving it when said second wheel is released in a direction toward said second position to reduce the price established, means actuated responsive to said driveplate during said second part of its revolution to release said means for holding said second wheel in position, means responsive to said driveplate during a third part of its revolution to reapply said means for holding said second wheel in position and for removing said means to couple said second wheel to said first wheel, and means actuated responsive to said first wheel reaching said second position to indicate the full payment of said price.

3. A coinbox for use at a receiver in a television system as recited in claim 2 wherein said first and second wheels each has gear teeth formed thereon and said means to couple said second wheel to said first wheel for driving it in a direction to reduce the price established includes a first and a second idler gear, a common shaft upon which said first and second idler gears are mounted spaced apart a distance equal to the spacing of the gear teeth on said first and second wheels, a bracket in which said common shaft is mounted, means to pivotally support said bracket adjacent said first and second wheels, a cam member attached to said bracket, a cam member engaging means mounted on said drive plate at a location adapted to engage said cam member during a second part of said drive plate revolution to pivot said bracket to apply said first and second idler gears to the gear teeth on said first and second wheel, and cam member disengaging means mounted on said driveplate at a location adapted to engage said cam member during a third part of said driveplate revolution to pivot said bracket to remove said first and second idler gears from the gear teeth on said first and second wheels, 4. A coinbox for use at a receiver as recited in claim 3 wherein said bracket for supporting said idler gear shaft has mounted thereon a flat stop member, and said first wheel has mounted on a side thereof two pairs of stop pins each pair being spaced apart to engage therebetween said flat stop member, one pair of pins being positioned on said first wheel to receive said stop member when said first wheel is in its no-price demand position and said bracket is pivoted to apply said first and second idler gears to said gear teeth of said first and second wheels, a second pair of pins being positioned on said first wheel to receive said stop member when said first wheel is in a position representing a reduction of price demanded to zero and said bracket is pivoted to apply said first and second idler gears to said gear teeth of said first and second wheels.

5. A coinbox for use at a receiver in a subscription television system of the type wherein signals from the transmitter are employed to establish a price required to be deposited in the coinbox before the receiver is enabled to intelligibly present a program, said coinbox comprising a price wheel, a credit wheel, gear teeth formed in said price wheel adjacent its periphery, at least one set of switch contacts mounted on a side of said price wheel, said credit wheel having gear teeth formed therein adjacent its periphery and serrations formed in one side thereof, means for rotatably mounting said price and credit wheels adjacent one another on a common shaft, means for establishing a first position for said price wheel representative of no-price demand, means for establishing a second position for said price wheel representative of full payment of a price, means for establishing a third position for said price wheel representative of a completed recording operation, first spring means for yieldably biasing said price wheel to said first position, means for establishing a no-credit position for said credit wheel, second spring means for yieldably biasing said credit wheel to said no-credit position, said second spring means providing a stronger bias than said first spring means, a pricing solenoid, first pawl means responsive to excitation of said pricing solenoid by said signals from said transmitter to rotate said price wheel against the bias of said first spring means to establish it at a position representative of a price to be paid, a holding solenoid, means for exciting said holding solenoid responsive to signals from said transmitter, second pawl means responsive to excitation of said holding solenoid to prevent said price wheel from returning to its first position, coin-sizing means including a rotatably supported driveplate, means responsive to the deposit of a coin in said coin-sizing means to rotate said driveplate through a revolution, a finger member carried by said driveplate, means to actuate said finger member during a first part of said driveplate revolution to engage the serrations of said credit wheel for rotating it against the bias of said second spring means through an arc determined by the value of a deposited coin in said sizing mechanism, a pivotally supported stop means positioned when quiescent in engagement with said credit-wheel gear teeth, a pair of idler gears, a shaft upon which said idler gears are mounted spaced apart the distance of the gear teeth on said respective price and credit wheels, bracket means to support said idler gears, means for pivotally supporting said bracket means with said idler gears in proximity to said price and credit-wheel gear teeth, means carried by said driveplate to pivot said bracket means to engage said price and credit-wheel gear teeth with said idler gears when said driveplate is in a second part of its revolution, means actuated responsive to said idler gears engaging said price and credit-wheel gear teeth for pivoting said stop means out of engagement with said credit-wheel gear teeth, means carried by said driveplate to pivot said bracket means during a third part of said driveplate revolution to disengage said idler gears and to pivot said stop member in engagement with said credit-wheel gear teeth, conductor means for co-operating with said price-wheel switch contacts when said price wheel is rotated through said idler gears to said second position, a first and a second stop member mounted on said price wheel respectively at said second and third positions, and means mounted on said bracket means to co-operate with said stop members when said bracket means is pivoted to engage said idler gears with said gear teeth to prevent rotation of said price and credit wheels when said price wheel is at one of said first, second, or third positions whereby the value of the coins deposited are stored as a credit in said credit wheel.

No references cited.